United States Patent
Ma et al.

(10) Patent No.: US 8,905,691 B2
(45) Date of Patent: Dec. 9, 2014

(54) ARC SURFACE MILLING ASSISTANT PROCESSING DEVICE

(75) Inventors: Zhao-Lei Ma, Shenzhen (CN);
Hong-Jun Zhu, Shenzhen (CN);
Chen-Hong Hou, Shenzhen (CN);
Xin-Ming Zhang, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 689 days.

(21) Appl. No.: 13/173,129

(22) Filed: Jun. 30, 2011

(65) Prior Publication Data
US 2012/0141222 A1  Jun. 7, 2012

(30) Foreign Application Priority Data
Dec. 7, 2010  (CN) .......................... 2010 1 0576723

(51) Int. Cl.
*B23Q 17/22* (2006.01)
*B27C 5/10* (2006.01)
*B27C 5/04* (2006.01)
*B23C 3/12* (2006.01)

(52) U.S. Cl.
CPC . *B27C 5/10* (2013.01); *B23C 3/126* (2013.01); *B27C 5/04* (2013.01)
USPC ........... 409/138; 409/218; 409/228; 409/204; 409/205

(58) Field of Classification Search
CPC ...... B23Q 17/22; B23Q 17/2233; B23C 1/06; B23C 3/12; B23C 3/28; B23C 2220/16; B23C 2255/00; B23C 2255/08
USPC ......... 409/138, 228, 229, 204–206, 218, 225, 409/226; 144/286.1, 286.5, 287
See application file for complete search history.

(56) References Cited

U.S. PATENT DOCUMENTS 2,365,436 A * 12/1944 Saucier ........................... 269/69
2,635,655 A *  4/1953 Linstead .................... 144/134.1
(Continued)

FOREIGN PATENT DOCUMENTS

CH  666845 A5 *  8/1988
CH  683241 A5 *  2/1994
(Continued)

*Primary Examiner* — Andrea Wellington
*Assistant Examiner* — Ryan Rufo
(74) *Attorney, Agent, or Firm* — Novak Druce Connolly Bove + Quigg LLP

(57) ABSTRACT

An arc surface milling machine includes a worktable, a base and a backup plate. The worktable is assembled adjacent to the base. The backup plate is adjustably mounted on the base and positioned adjacent to the worktable. The worktable includes a work surface, an opposite bottom surface, and a mounting end. The base is assembled to the mounting end of the worktable. The work surface defines a concave wedge-shaped receiving space adjacent to the mounting end and forms a milling opening communicating with the work surface and the mounting end.

14 Claims, 4 Drawing Sheets

(56) References Cited

U.S. PATENT DOCUMENTS

| | | | |
|---|---|---|---|
| 2,839,107 A * | 6/1958 | Emmons | 144/218 |
| 3,125,934 A * | 3/1964 | Persson | 409/138 |
| 3,185,470 A * | 5/1965 | Zitner | 269/91 |
| 3,241,453 A * | 3/1966 | Baldwin | 409/180 |
| 3,628,579 A * | 12/1971 | Roche | 144/135 |
| 4,163,465 A * | 8/1979 | Strong | 144/87 |
| 4,542,776 A * | 9/1985 | Kehoe | 144/353 |
| 4,556,094 A * | 12/1985 | Willocks | 144/253.2 |
| 4,881,857 A * | 11/1989 | Tanaka et al. | 409/138 |
| 5,611,378 A * | 3/1997 | Brazell | 144/135.2 |
| 6,340,039 B1 * | 1/2002 | Chang | 144/253.2 |

FOREIGN PATENT DOCUMENTS

| | | |
|---|---|---|
| CN | 2247576 Y | 2/1997 |
| CN | 201529902 U | 7/2010 |
| DE | 29609302 U1 * | 8/1996 |
| FR | 2793431 A3 * | 11/2000 |
| JP | 7223148 A | 8/1995 |
| TW | M387728 | 9/2010 |

\* cited by examiner

ARC SURFACE MILLING ASSISTANT PROCESSING DEVICE

BACKGROUND

1. Technical Field

This disclosure relates to assistant processing devices, and particularly, to an arc surface milling assistant processing device.

2. Description of Related Art

An arc surface milling machine often comes equipped with a clamping tool such as a vise for clamping pre-milled workpieces. Each workpiece is clamped by the vise prior to milling, and is detached from the vise after milling. Each workpiece needs to be timely clamped and detached one by one during the arc surface milling process. Thus, the processing efficiency of the existing milling machines is relatively low. In addition, the conventional vise is heavy and difficult to operate.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
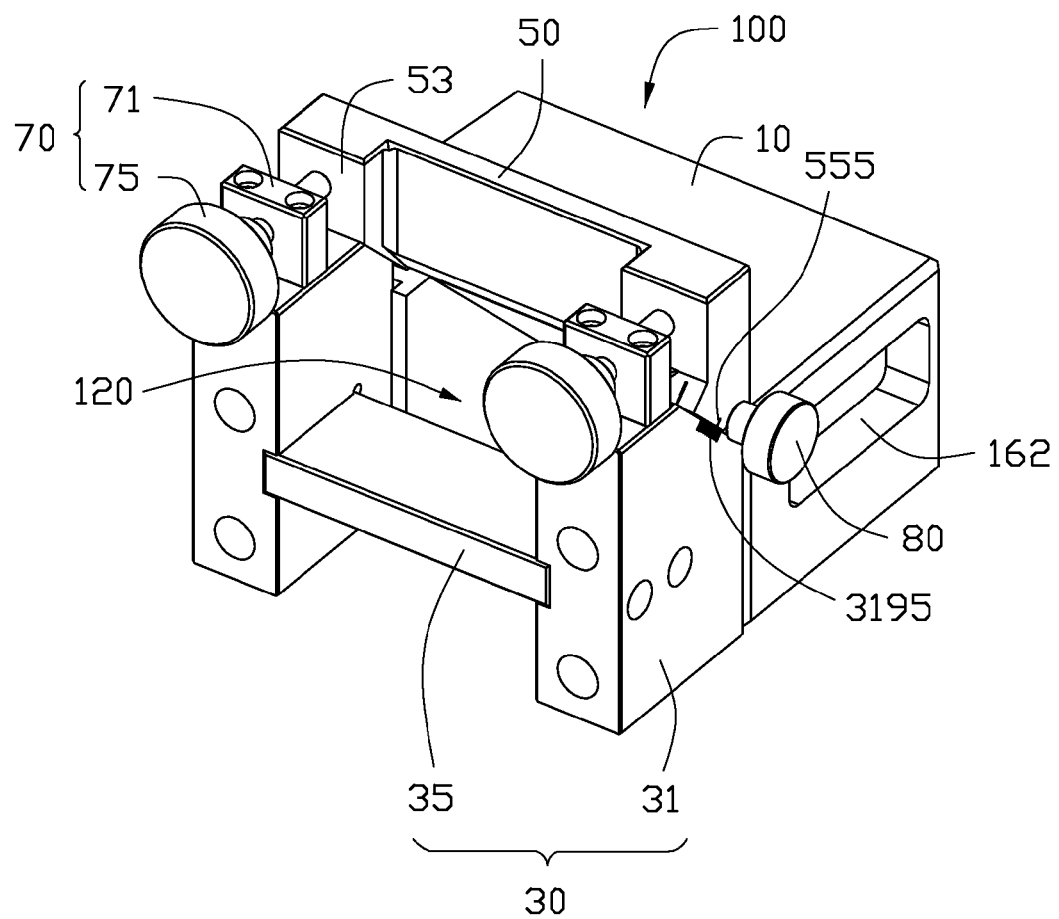
FIG. 1 is an assembled, perspective view of an embodiment of an arc surface milling assistant processing device.

Referring to FIG. 1, an embodiment of an arc surface milling assistant processing device 100 is shown. The arc surface milling assistant processing device 100 includes a worktable 10, a base 30, a backup plate 50, a fine adjusting assembly 70, and two retaining members 80. The worktable 10 is assembled adjacent to the base 30. The backup plate 50 is adjustably mounted on the base 30 via the fine adjusting assembly 70, and is retained in a preset position via the two retaining members 80. The backup plate 50 is positioned adjacent to the worktable 10 along a direction substantially perpendicular to the worktable 10.

Figure 2:
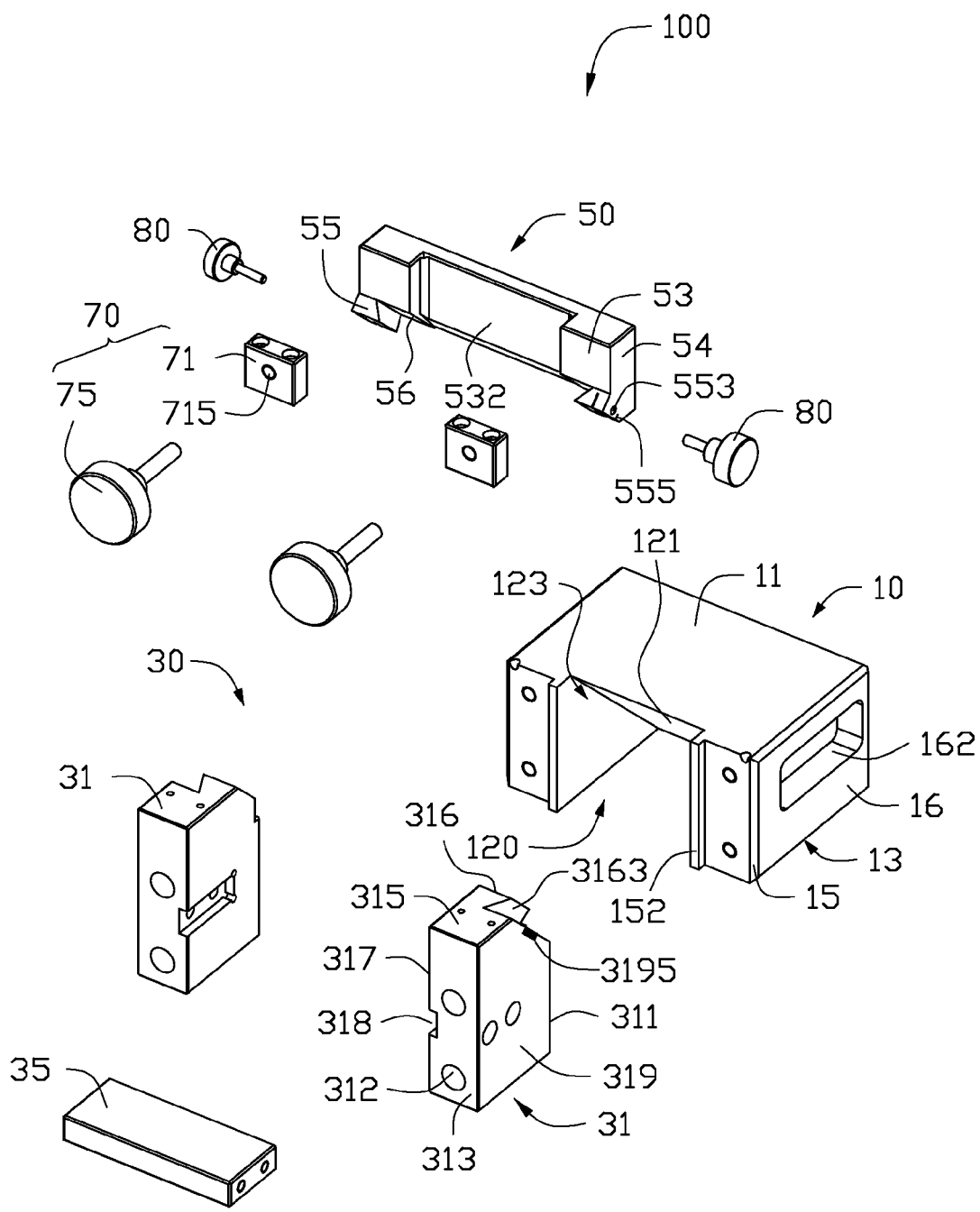
FIG. 2 is an exploded, perspective view of the arc surface milling assistant processing device of FIG. 1.
Figure 3:
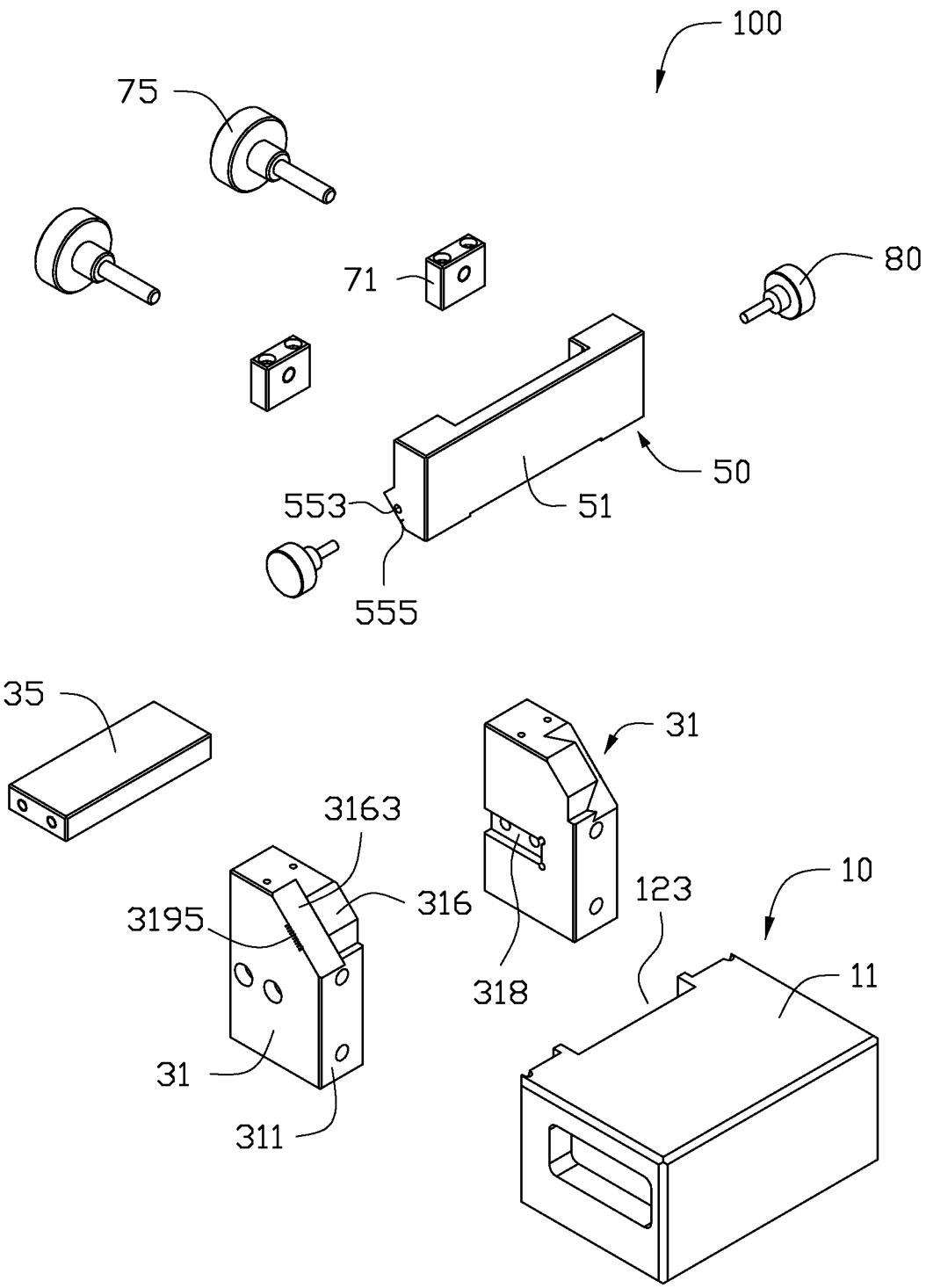
FIG. 3 is similar to FIG. 2, but viewed from another aspect.

Also referring to FIGS. 2 and 3, the worktable 10 includes a work surface 11, a bottom surface 13 opposite to the work surface 11, a mounting end 15, and two opposite side surfaces 16. The work surface 11 defines a concave wedge-shaped receiving space 12 adjacent to and through the mounting end 15, thereby forming a bar-shaped milling opening 123 to communicate with the work surface 11 and the mounting end 15. The receiving space 12 further includes a slanted surface 121 inclining from one end of the work surface 11 positioned adjacent to the mounting end 15 toward the bottom surface 13 of the worktable 10 positioned away from the mounting end 15. Two abutting blocks 152 are parallelly formed on the end surface of the mounting end 15 of the worktable 10 and respectively positioned at two sides of the receiving space 12 along a direction substantially perpendicular to the work surface 11. Two holding slots 162 are respectively recessed in two opposite side surfaces 16 of the worktable 10.

The base 30 is substantially H-shaped and is adjacently assembled to the mounting end 15 of the worktable 10. The base 30 includes two support blocks 31 and a standard plate 35 connecting the two support blocks 31 together. The two support blocks 31 are parallelly mounted to the mounting end 15 of the worktable 10, and respectively abut against the two abutting blocks 152 and positioned at two sides of the receiving space 12. Each support block 31 includes an assembling end 311, a free end 313 opposite to the assembling end 311, a top surface 315, an inner side surface 317, and an outer side surface 319 opposite to the inner side surface 317. Two mounting holes 312 are defined through the free end 313 of the support block 31. The support block 31 further includes an inclined mounting surface 316 formed at the assembling end 311 and positioned adjacent to the top surface 315. The inclined mounting surface 316 inclines from the top surface 315 toward the assembling end 311. A substantially V-shaped assembling slot 3163 is defined in the inclined mounting surface 316 and positioned adjacent to the outer side surface 319. A mounting slot 318 is defined in the inner side surface 317 of the support block 31 and is substantially parallel to the top surface 315. One end of the mounting slot 318 communicates with the free end 313 of the support block 31. An adjusting scale 3195 is disposed on the outer side surface 319 of the support block 31 and positioned adjacent to the assembling slot 3163 along the edge of the inclined mounting surface 316.

The backup plate 50 is adjustably mounted to the base 30 by the fine adjusting assembly 70, and is retained at a preset position by the retaining member 80. The backup plate 50, the base 30, and the work table 10 together forms a tool assembling space 120. In the illustrated embodiment, the backup plate 50 includes an abutting surface 51, a resisting surface 53 opposite to the abutting surface 51, two end surfaces 54, and a wedge-shaped inclined mounting side surface 56. The middle portion of the resisting surface 53 defines a receiving slot 532 communicating with the inclined mounting side surface 56. Two latching blocks 55 are oppositely formed on the inclined mounting side surface 56, and are respectively positioned adjacent to two end surfaces 54 of the backup plate 50, corresponding to the two assembling slots 3163 of the base 30. In the illustrated embodiment, one end of each latching block 55 aligns with one corresponding end surface 54, and the other end of each latching block 55 is substantially V-shaped and latches into one corresponding assembling slot 3163 of the base 30. Each latching block 55 further defines a locking hole 553 and a standard scale mark 555 at an outer end surface thereof away from the receiving slot 532.

The fine adjusting assembly 70 is adjustably mounted to the base 30 and resists against the backup plate 50, for adjusting the position of the backup plate 50 relative to the base 30 and the worktable 10. In the illustrated embodiment, the fine adjusting assembly 70 includes two standard blocks 71 and two adjusting nuts 75. The two standard blocks 71 are respectively fixed onto the two top surfaces 315 of the two support block 31. Each standard block 71 defines an adjusting screw hole 715. The two adjusting nuts 75 are respectively assembled to, and pass through the two adjusting screw holes 715 of the two standard blocks 71. The distal ends of the two adjusting nuts 75 resist against the resisting surface 53 of the backup plate 50.

The two retaining members 80 can be two bolts respectively passing through the two locking holes 553 and fixing to the two support blocks 31 as shown in the illustrated embodiment.

When assembling the arc surface milling assistant processing device 100, the two support blocks 31 are parallelly fixed to the mounting end 15 of the worktable 10, and respectively positioned at two sides of the receiving space 12. The inner side surface 317 of the assembling end 311 of each support block 31 resists against and abuts against the corresponding one abutting block 152 of the mounting end 15 of the worktable 10. The standard plate 35 is assembled between the two support blocks 31 along a direction substantially parallel to the work surface 11 of the worktable 10, for connecting the two support blocks 31 together. Two ends of the standard plate 35 are respectively aligned with and latched into the two mounting slots 318 of the two support blocks 31. The backup plate 50 is mounted on the base 30 along a direction substantially perpendicular to the work surface 11 of the worktable 10. The backup plate 50, the base 30 and the worktable 10 together form the tool assembling space 120. The two latching blocks 55 of the backup plate 50 are aligned with and latched into the corresponding two assembling slots 3163 of the base 30. The inclined mounting side surface 56 of the backup plate 50 resists against the corresponding inclined mounting surface 316 of the base 30. The two retaining members 80 respectively pass through the two locking holes 553 and are fixed to the two support blocks 31. The two standard blocks 71 of the fine adjusting assembly 70 are respectively fixed onto the two top surfaces 315 of the two support block 31. The two adjusting nuts 75 respectively pass through the two adjusting screw holes 715 of the two standard blocks 71 and resist against the resisting surface 53 of the backup plate 50 to finish the assembly of the arc surface milling assistant processing device 100.

Figure 4:
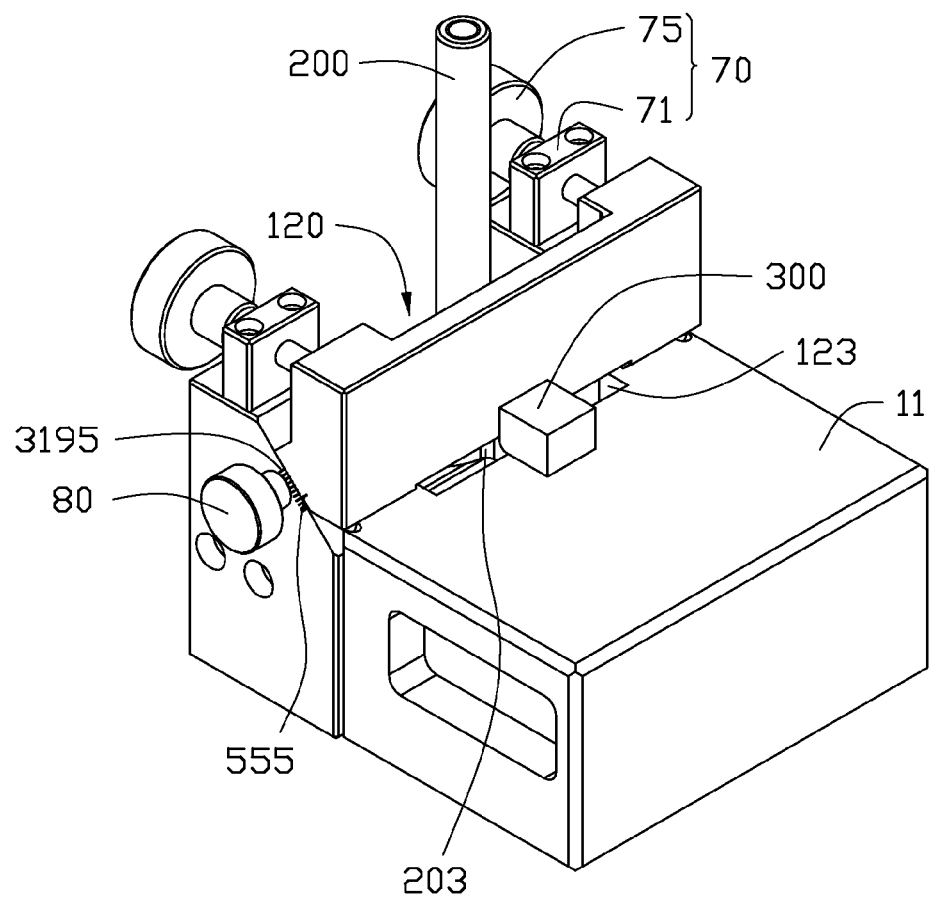
FIG. 4 is similar to FIG. 1, but viewed from another aspect and the arc surface milling assistant processing device is in an operating state.

Also referring to FIG. 4, when using the arc surface milling assistant processing device 100, the arc surface milling assistant processing device 100 is applied to a milling machine (not shown). During usage, a milling tool 200 of the milling machine is inserted into and received within the tool assembling space 120 of the arc surface milling assistant processing device 100. The milling tool 200 has a tool edge 203 disposed at a distal end thereof. The tool edge 203 of the milling tool 200 is partially exposed from the milling opening 123 of the work surface 11 of the worktable 10, for milling a pre-milled workpiece 300 placed on the work surface of the worktable 10. In the illustrated embodiment, the size of milling opening 123 can be adjusted by adjusting the two retaining members 80 and the fine adjusting assembly 70, thereby obtaining a preferred processing parameter of the milling tool 200. The pre-milled workpiece 300 is placed on the work surface 11 of the worktable 10 and held by a user from one end thereof. The other end of the pre-milled workpiece 300 faces toward the milling opening 123 and resists against the abutting surface 51 of the backup plate 50. Finally, the milling tool 200 is driven to mill the workpiece 300.

The arc surface milling assistant processing device 100 has a simple structure, and can be easily assembled and operated. The pre-milled workpiece 300 does not need to be clamped by a special clamping device such as the vise when milling the pre-milled workpiece 300. The clamping work can be done manually by a user, thereby saving the time it takes to clamp and detach the workpiece 300. In addition, the arc surface milling assistant processing device 100 is adjustable to mill different workpieces 300.

It is to be understood, however, that even through numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An arc surface milling assistant processing device, comprising:
    a worktable comprising a work surface, a bottom surface opposite to the work surface, and a mounting end, the work surface defining a concave receiving space adjacent to the mounting end, thereby forming a milling opening communicating with the work surface and the mounting end;
    a base assembled adjacent to and connected with the mounting end of the worktable, wherein the base comprises two substantially parallel support blocks and a standard plate connecting the two support blocks together; the two support blocks are fixed to the mounting end of the worktable and respectively positioned at two sides of the receiving space; and
    a backup plate adjustably mounted on the base and positioned adjacent to the worktable, thereby forming a tool assembling space together with the base and the worktable,
    wherein, the backup plate comprises a wedge-shaped inclined mounting side surface; the base defines an inclined mounting surface declining toward the work surface of the worktable and positioned adjacent to a top surface thereof; the inclined mounting side surface of the backup plate resists against the inclined mounting surface of the base.

2. The arc surface milling assistant processing device as claimed in claim 1, wherein the backup plate further comprises an abutting surface, the abutting surface of the backup plate faces toward the work surface of the worktable.

3. The arc surface milling assistant processing device as claimed in claim 2, wherein the backup plate further comprises a resisting surface opposite to the abutting surface, the backup plate further comprises two end surfaces; a receiving slot is defined in the resisting surface and communicates with the inclined mounting side surface.

4. The arc surface milling assistant processing device as claimed in claim 3, wherein the arc surface milling assistant processing device further comprises a fine adjusting assembly adjustably mounted to the base and resisting against the resisting surface of the backup plate, to adjust the position of the backup plate relative to the base and the worktable.

5. The arc surface milling assistant processing device as claimed in claim 1, wherein the worktable further comprises two abutting blocks formed on the end surface of the mounting end and respectively positioned at two sides of the receiving space; the two abutting blocks are substantially parallel to each other, the two support blocks respectively abuts with the two abutting blocks of the worktable.

6. The arc surface milling assistant processing device as claimed in claim 1, wherein the worktable further comprises two opposite side surfaces and two holding slots respectively recessed from the two opposite side surfaces of the worktable.

7. The arc surface milling assistant processing device as claimed in claim 1, wherein the fine adjusting assembly comprises two standard blocks and two adjusting nuts, the two standard blocks are respectively fixed onto the two support blocks, each of the standard blocks defines an adjusting screw hole; the two adjusting nuts are respectively assembled to, and pass through the two adjusting screw holes of the two standard blocks and further resist against the resisting surface of the backup plate.

8. The arc surface milling assistant processing device as claimed in claim 7, wherein the backup plate further comprises two latching blocks oppositely formed on the inclined mounting side surface and positioned adjacent to two end surfaces of the backup plate; each of the support blocks defines an assembling slot in the inclined mounting surface thereof corresponding to and latching with the two latching blocks of the backup plate.

9. The arc surface milling assistant processing device as claimed in claim 8, wherein each of the two latching blocks defines a locking hole and a standard scale mark at an outer end surface thereof; the arc surface milling assistant processing device further comprises two retaining members respectively passing through the two locking holes and fixed to the two support blocks.

10. An arc surface milling assistant processing device, comprising:
- a worktable having a work surface, a bottom surface opposite to the work surface, and a mounting end, the work surface defining a concave receiving space adjacent to the mounting end, thereby forming a milling opening communicating with the work surface and the mounting end;
- a base assembled adjacent to and connecting with the mounting end of the worktable, wherein the base comprises two substantially parallel support blocks and a standard plate connecting the two support blocks together; the two support blocks are fixed to the mounting end of the worktable and respectively positioned at two sides of the receiving space;
- a backup plate adjustably mounted on the base and positioned adjacent to the worktable, thereby forming a tool assembling space together with the base and the worktable; and
- a fine adjusting assembly adjustably mounted to the base and resisting against the backup plate, to adjust the position of the backup plate relative to the base and the worktable,
- wherein, the backup plate comprises a wedge-shaped inclined mounting side surface; the base defines an inclined mounting surface declining toward the work surface of the worktable and positioned adjacent to a top surface thereof; the inclined mounting side surface of the backup plate resists against the inclined mounting surface of the base.

11. The arc surface milling assistant processing device as claimed in claim 10, wherein the tool assembling space communicates with the milling opening and the receiving space; the receiving space comprises a slanted surface inclining from one end of the work surface adjacent to the mounting end toward the bottom surface of the worktable.

12. The arc surface milling assistant processing device as claimed in claim 11, wherein the worktable further comprises two opposite side surfaces and two holding slots respectively recessed from two opposite side surfaces of the worktable.

13. The arc surface milling assistant processing device as claimed in claim 10, wherein the worktable further comprises two abutting blocks formed on the end surface of the mounting end and respectively positioned at two sides of the receiving space; the two abutting blocks are substantially parallel to each other, the two support blocks respectively abuts with the two abutting blocks of the worktable.

14. The arc surface milling assistant processing device as claimed in claim 13, wherein the backup plate further comprises an abutting surface, the abutting surface of the backup plate faces toward the work surface side of the worktable.

* * * * *